Oct. 31, 1950     D. A. WALLANCE     2,527,603
FURNITURE LEG
Filed April 23, 1947     2 Sheets-Sheet 1
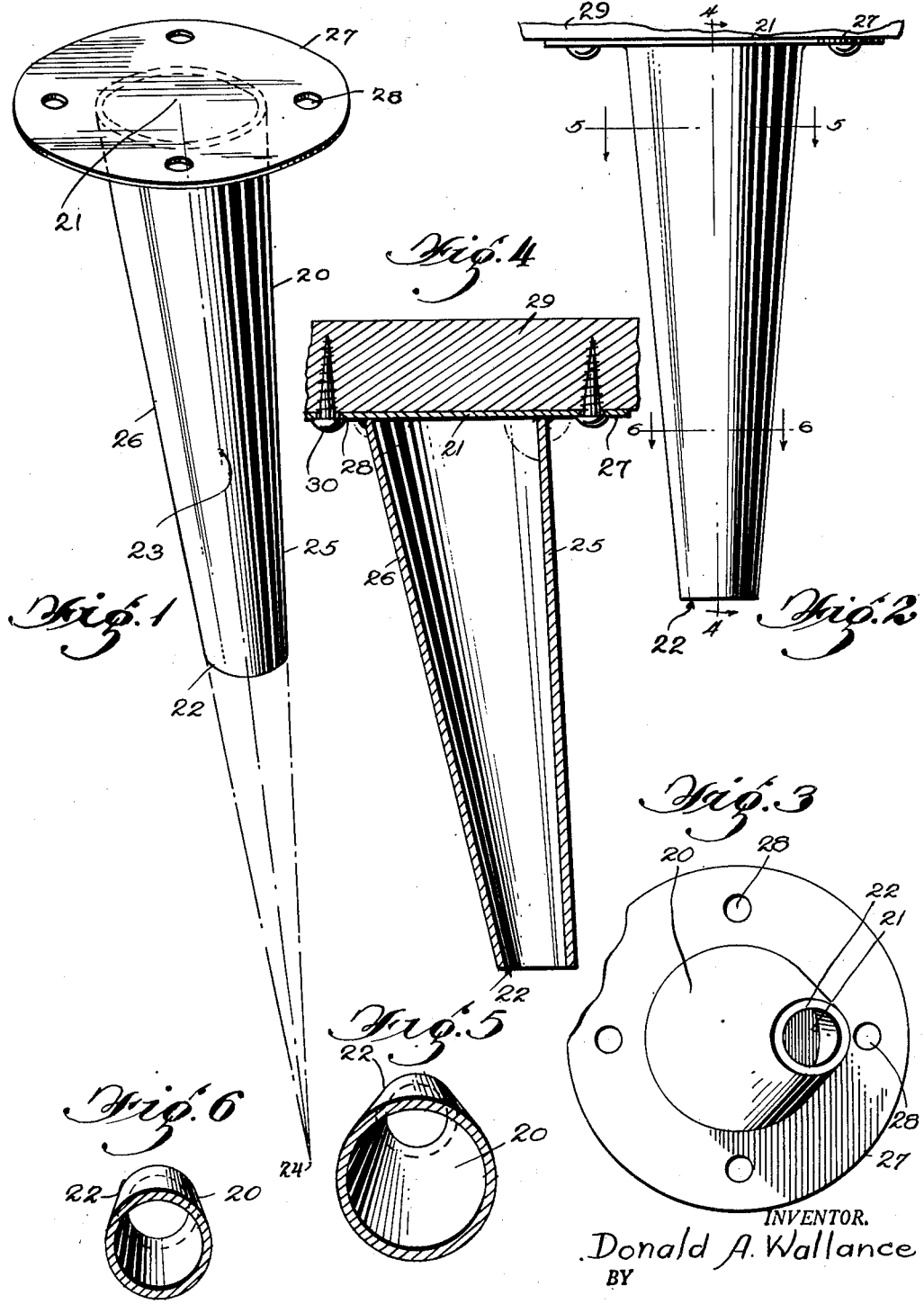
INVENTOR.
Donald A. Wallance
BY
W. J. Eccleston,
ATTORNEY Oct. 31, 1950     D. A. WALLANCE     2,527,603
FURNITURE LEG
Filed April 23, 1947     2 Sheets-Sheet 2
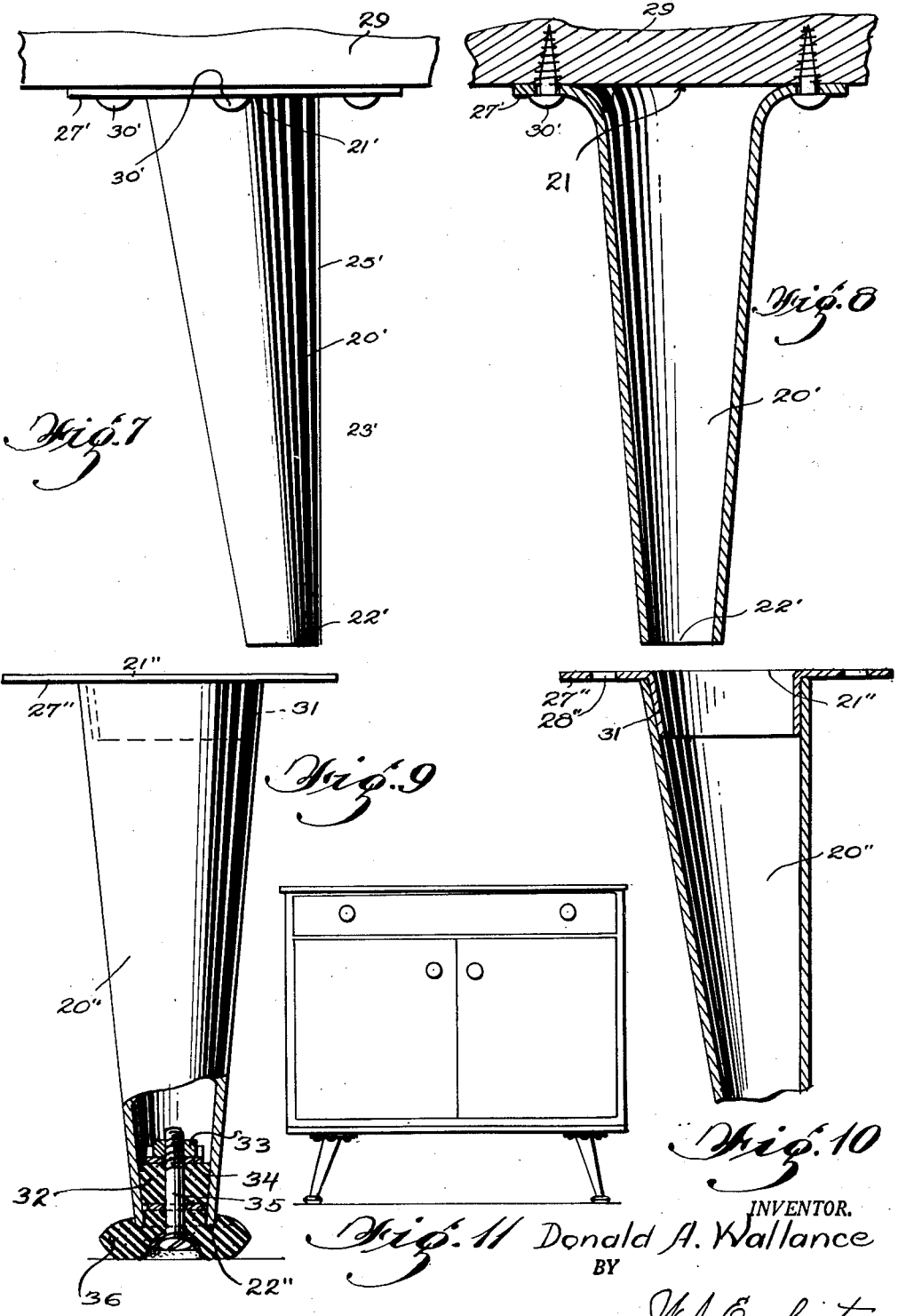

Patented Oct. 31, 1950

2,527,603

UNITED STATES PATENT OFFICE 2,527,603

FURNITURE LEG

Donald A. Wallance, New York, N. Y.

Application April 23, 1947, Serial No. 743,327

2 Claims. (Cl. 248—189)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to a furniture leg, and more particularly to a furniture leg having the general shape of an inverted circular oblique truncated cone provided with a flange for attachment to furniture.

It is an object of my invention to provide a furniture leg possessing great compressive and shearing strength and a pleasing appearance.

A further object of my invention is a furniture leg capable of easy attachment to and detachment from a furniture body.

Another object of my invention is a furniture leg which can be inexpensively formed from a variety of structural materials.

Other objects of my invention will be readily apparent from the following description:

A furniture leg in accordance with my invention generally consists of an inverted circular oblique conical portion, truncated in a plane parallel to its base, and having an outwardly extending flange integral with its base for attachment to a piece of furniture.

The appended drawings show several embodiments of my invention, but are not to be taken as an exclusive illustration of all the modifications of which my invention is capable.

In the drawings,

Fig. 1 is a perspective view of a furniture leg in accordance with my invention.

Fig. 2 is an elevational view of the embodiment shown in Fig. 1.

Fig. 3 is a bottom plan view of the embodiment shown in Fig. 1.

Fig. 4 is a section taken along lines 4—4 of Fig. 2.

Figs. 5 and 6 are sections taken along lines 5—5 and 6—6, respectively, of Fig. 2.

Fig. 7 is an elevation of a modified embodiment of a furniture leg in accordance with my invention.

Fig. 8 is a section taken along lines 8—8 of Fig. 7.

Fig. 9 is an elevational view of another modification of a furniture leg in accordance with my invention.

Fig. 10 is a sectional view, partly broken away, taken along lines 10—10 of Fig. 9.

Fig. 11 is a front elevation of a cupboard equipped with furniture legs in accordance with my invention.

More particularly, in the embodiment illustrated in Figs. 1 to 6 is shown a furniture leg consisting of a conical portion 20 having a circular base 21 truncated at 22 in a circular plane parallel to circular base 21. Axis 23 of the cone is inclined relative to base 21 to connect the center of base 21 to an imaginary vertex 24. A truncated oblique cone is thus defined which has a circular cross section in any plane parallel to its base (as is shown in Figs. 5 and 6). In this embodiment, vertex 24 is located laterally of the circumference of the base 21; consequently, the angle of a tangential plane of truncated cone 20 at 25 is at an obtuse angle to base 21, while a tangential plane at 26 forms an acute angle with base 21.

To add to the compressive strength of the structure, the inverted cone which constitutes the body portion of the leg, is truncated in a plane whose projection on base 21 is a circle intersecting the circumference of base 21. If the cone were truncated so close to its vertex that the truncation surface, projected on the plane of the base were to fall wholly outside the circumference bounding the base, there would be danger of buckling of the leg under a weighty piece of furniture.

The truncated surface 22 of the conical leg either engages the ground, or is equipped with a conventional glider (not shown).

Base 21 of the conical leg is integrally joined to a flange extending outwardly in the same plane as base 21, which flange in the embodiment shown in Figs. 1 to 6 consists of a circular disk 27 welded to the cone at base 21. Preferably, perforations 28 are provided in the flange outwardly of base 21, for the attachment of the leg to a furniture base 29 by means of wood screws 30 or similar fastening means. Obviously, a tangential plane of conical portion 20 will be at an angle to flange 27 supplemental to the angle formed by base 21 and the tangential plane, and consequently an obtuse angle between the base and tangential plane is supplemented by an acute angle between the tangential plane and flange, and vice versa.

In the embodiment illustrated in Figures 7 and 8, a truncated circular cone surface 20' is bounded by a base 21', and truncation plane 22'. Axis 23' of the conical portion is so inclined relative to base 21' that all tangential planes of the cone surface, except one, form acute angles with the plane of base 21', and one tangential plane, at 25' forms a right angle with the plane of base 21'. Consequently, the surface of truncation 22', if projected on base 21', forms a circle inscribed in and touching the circumference which bounds base 21'. In this embodiment, the attachment flange 27' is formed by expanding and flattening the leg at its base portion to form an outwardly extending angular rim in the same plane as base 21'. This flange or rim 27' is also preferably provided with perforations 28' for attachment to furniture 29' with wood screws or similar fastening means 30'.

The embodiment of Figs. 9 and 10 corresponds to that shown in Figs. 7 and 8; however, flanged portion 27" is constituted by an annulus having an inner concentrical flange 31 fitting inside conical portion 20" of the leg; angular flange 27" and truncated conical portion 20" are thus connected at base 21" either by a force fit, or by welding or adhesively.

To attach a glider to any hollow furniture leg in accordance with my invention, it is advantageous to use the attachment means sketched in Figure 9 of the drawings: an inverted circular truncated conical plug 32 of rubber or similar elastic material, having a central perforation 33 and equipped with a nut 33 and washer 34, is inserted within the leg, and a threaded bolt 35 is inserted through glider 36, and the plug assembly. Nut 33, when engaged by bolt 35, is drawn towards glider 36 and thus exerts pressure on plug 32, causing the latter to expand laterally into frictional engagement with the inner wall of the leg. Relative rotation by the nut and plug is prevented by washer 34. The engagement of the expanded plug with the leg is made still more secure by the conical shape of both, which prevents withdrawal of the plug through the constricted opening formed by the truncation of the leg even by the exercise of a very strong pull on the glider.

A furniture leg in accordance with my above described invention may be made of practically every type of structural material customarily used in furniture making, such as cast iron, steel tubing, wood, and also plastic material. It may be either solid or hollow, although I prefer the latter construction because of its lighter weight. The cone structure of the leg will withstand deformation under great external shearing forces. Great compressive strength is assured by the location of the surface of truncation of the cone in a plane so chosen that if the surface of truncation is projected on the base, it will lie partly or wholly within the circumference of the base.

Having thus described my invention, I wish it to be understood that modifications other than those described and illustrated, for instance, changes of proportions or specific construction will easily occur to the expert, and thus, if made, will fall within the scope of my invention. I thus desire to be limited only by the appended claims.

I claim:

1. A furniture leg possessing great compressive and shearing strength, comprising a circular flange for attachment to a furniture body, and a truncated oblique circular hollow cone integral with said flange, said flange extending outwardly from the base of said cone, the surface of said cone forming angles with the circumferential portion of said circular flange, said angles diminishing gradually from an obtuse angle to an angle not exceeding 90°.

2. A furniture leg possessing great compressive and shearing strength, comprising a circular flange for attachment to a furniture body, and a truncated oblique circular hollow cone integral with said flange, said flange extending outwardly from the base of said cone, the surface of said cone forming angles with the circumferential portion of said circular flange, said angles diminishing gradually from an obtuse angle to an acute angle, a projection of the truncation surface of said cone upon the plane of the base of said cone lying partly within the circumference of said base.

DONALD A. WALLANCE.

REFERENCES CITED

The following references are of record in the file of this patent:

UNITED STATES PATENTS

| Number | Name | Date |
|---|---|---|
| 1,408,114 | Mathieu | Feb. 28, 1922 |
| 1,560,279 | Marks | Nov. 3, 1925 |
| 2,047,346 | Weston | July 14, 1936 |

FOREIGN PATENTS

| Number | Country | Date |
|---|---|---|
| 7,947 | Great Britain | 1890 |
| 264,413 | Germany | Sept. 26, 1913 |

OTHER REFERENCES

"Modern Furniture" by Haywood-Wakefield, Gardner, Mass. (Copy in Design Division).